No. 813,459. PATENTED FEB. 27, 1906.
W. W. SLADE & H. F. BOWER.
LENS CUTTING MACHINE.
APPLICATION FILED MAY 6, 1905.

3 SHEETS—SHEET 1.

Witnesses

Inventors:
Walter W. Slade
Henry F. Bower
By James Hamilton
Attorney

No. 813,459. PATENTED FEB. 27, 1906.
W. W. SLADE & H. F. BOWER.
LENS CUTTING MACHINE.
APPLICATION FILED MAY 6, 1905.

3 SHEETS—SHEET 2.

Witnesses
T. L. McCabe
G. L. Hamilton

Inventors:
Walter W. Slade
Henry F. Bower
by James Hamilton
Attorney

UNITED STATES PATENT OFFICE.

WALTER W. SLADE, OF BOSTON, AND HENRY F. BOWER, OF EVERETT, MASSACHUSETTS, ASSIGNORS TO GLOBE OPTICAL COMPANY, OF BOSTON, MASSACHUSETTS, A CORPORATION OF MASSACHUSETTS.

LENS-CUTTING MACHINE.

No. 813,459.  Specification of Letters Patent.  Patented Feb. 27, 1906.

Application filed May 6, 1905. Serial No. 259,226.

*To all whom it may concern:*

Be it known that we, WALTER W. SLADE, of Boston, in the county of Suffolk, and HENRY F. BOWER, of Everett, in the county of Middlesex, Commonwealth of Massachusetts, citizens of the United States, have invented certain new and useful Improvements in Lens-Cutting Machines, of which the following is a specification, reference being had to the accompanying drawings.

Our invention relates to improvements in machines for cutting lenses for optical devices, such as eyeglasses and spectacles; and the object of our invention is to provide a machine of this class which shall embody novel means for facilitating the changing of the pattern in an expeditious manner, novel means for readily making the size adjustment of the pattern, novel means for keeping the glass secure from slipping during the operation of cutting, and a novel device for centering the glass.

Figure 1:
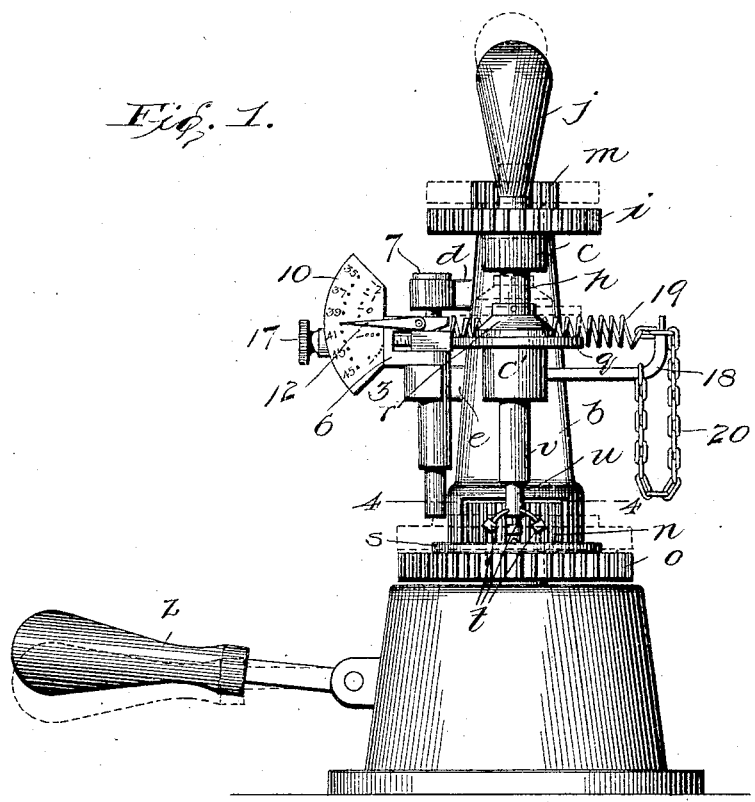
Figure 4:
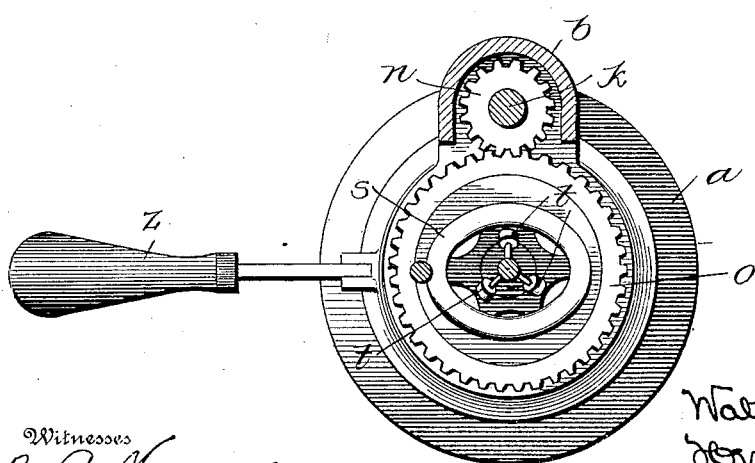
Figure 2:
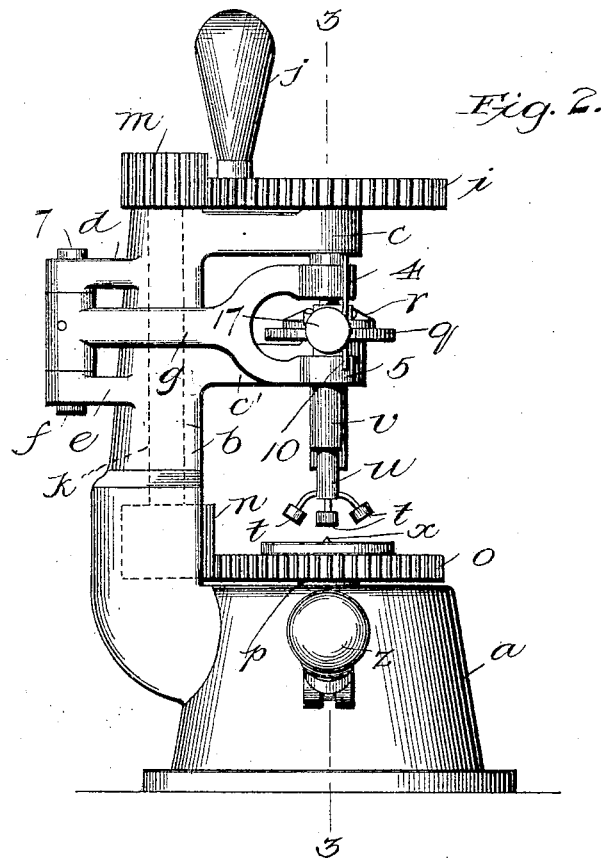
Figure 5:
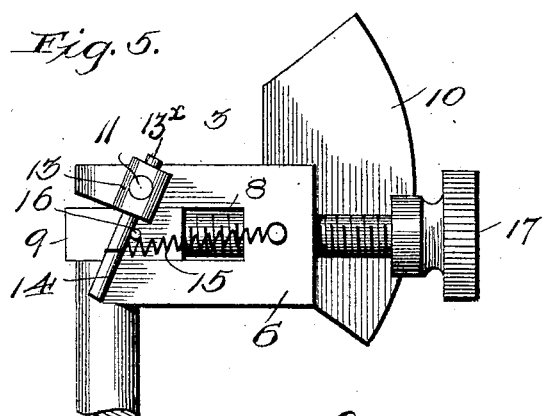
Figure 7:
Figure 3:
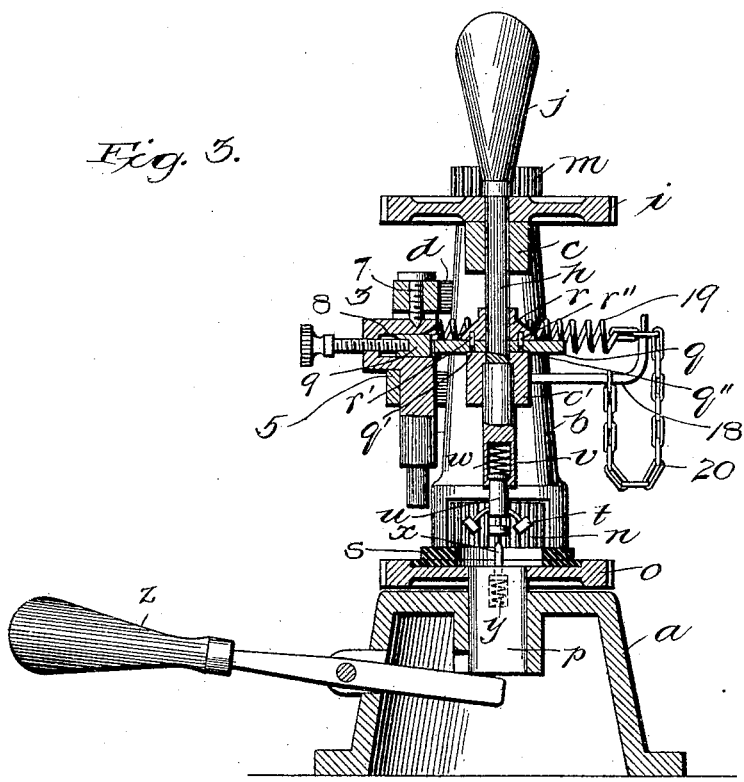
Figure 6:
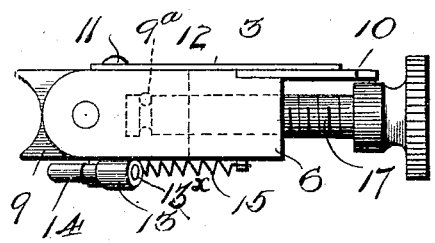

In the drawings illustrating the principle of our invention and the best mode now known to us of applying that principle, Figure 1 is a front elevation of our new machine. Fig. 2 is a side elevation thereof. Fig. 3 is a sectional view on the line 3 3, Fig. 2. Fig. 4 is a sectional view on the line 4 4, Fig. 1; and Figs. 5, 6, and 7 illustrate details hereinafter referred to.

From the hollow base $a$ springs a standard $b$, from which project forwardly the arms $c$ and $c'$. (See Figs. 2 and 3.) Integral with the standard $b$ are formed two lugs $d$ and $e$, which serve as bearings for the carrier-shaft $f$ of the carrier $g$, formed with arms or forks 4 and 5.

The arms $c$ and $c'$ serve as bearings for a shaft $h$, Fig. 3, to the upper end of which is secured a gear $i$, by which it is driven and which is rotated by hand, for which purpose it is provided with the knob $j$. The standard $b$ serves as a bearing for a shaft $k$, fast to the upper end of which is a pinion $m$, Fig. 2, and fast to the lower end of which is a pinion $n$. The latter pinion $n$ meshes with a gear $o$, fast upon a shaft $p$, which has a bearing and is slidably fitted in the base $a$, Figs. 2 and 3.

The pattern $q$ is held (see Fig. 7) between the top surface of the arm $c'$ and a presser-disk $r$, fast to the shaft $h$, the presser-disk being provided with two downwardly-projecting pins or studs $r'$ $r''$, which enter holes $q'$ $q''$ in the pattern $q$. By raising the gear $i$ and its connected shaft $h$ to the position shown in dotted lines in Fig. 1 the studs are withdrawn from the holes in the pattern $q$, thereby enabling the operator to remove the pattern and replace it by another, if desired.

The glass to be cut or marked is held between the lens-bed $s$, mounted upon the gear $o$, Fig. 3, and the tripod $t$ $t$ $t$. (See dotted lines in lower part of Fig. 1.) The shaft $u$ of the tripod is rotatably mounted in the lower end of sleeve $v$, Fig. 3, and is urged downwardly by a spring $w$.

The use of a tripod has several advantages over the use of a single presser-foot, among which may be mentioned the following: With a single presser-foot tilting of the lens is very liable to occur, and such tilting results in the glass not being cut true. This occurs even with the pads used in ordinary practice. The tripod prevents the glass from tilting and insures a true cut thereby. Again, with a single presser-foot the pressure is brought at the center of the lens and is concentrated there. Moreover, the pressure is made very great at times in the effort to hold the work steady, so when thin glass is worked upon breakage results. In our new machine the pressure of the tripod is always the same and is never upon the center of the lens, whereby the annoyance and expense resulting from breakage of the glass is obviated. Furthermore, in ordinary practice with a single presser-foot different pads are used in cutting the different forms (concave, convex, and plain) of lenses. By using a tripod a single kind of pad is used for all forms of lenses, with a resulting saving in operating expenses.

Centrally mounted in the shaft $p$ is a spring-controlled centering-pin $x$. The spring $y$, controlling the centering-pin $x$, is of slight tension, so that the weight of the glass forces the pin down, thereby preventing any interference in the operation of cutting. The centering-pin is kept by its spring in contact with the glass or work no matter what may be the thickness of the pad used, and its point indicates to the operator just where to place or adjust the intersection of the lines marked upon the glass to indicate the center of the cut lens. We consider this an advantage which will become perfectly obvious when the arrangement is contrasted with the usual one of forming a hole in the lens-bed to indicate the center of the same, in which case it is most difficult to center a lens of thick glass. This difficulty becomes more pronounced when a thick pad is used, elevating the work far above the centering-hole and bringing into play parallax, which results in imperfect centering and untrue cutting.

It will be obvious that with a tripod which does away with the necessity of changing the pad for different forms of glass and the employment of a centering-pin which enables the glass to be set quickly in true position the output of the machine is greatly increased.

To raise the shaft $p$, and with it the gear $o$ and lens-bed $s$, and to force thereby the glass into contact with the tripod $t\ t\ t$ against the tension of the spring $w$ and into contact with the tool in the tool-holder 3, a lever $z$ is provided, which is fulcrumed in the base $a$, as shown in Fig. 3.

The holder 3 is mounted in the forks or arms 4 5 of the carrier $g$. The offset portion of the holder 3, Figs. 3 and 5, rests upon the upper face of the lower fork 5, while a screw 7, passing through the upper fork 4, secures the holder 3 in place. In a slideway or slot 8 in the offset portion 6 travels a block 9, the inner end of which is concaved, Fig. 6. Mounted upon the offset portion 6 is a graduated segment 10, and passing through the upper part of the offset portion is a shaft 11, upon one end of which is a pointer 12, that coöperates with the graduated segment 10, Fig. 1, and held fast upon the other end of which by means of a set-screw $13^\times$ is a sleeve 13, adjustably mounted in which is a pin 14. One end of a spring 15 is attached to the pin 14, and the other end of said spring is secured to the offset portion 6. The block 9 is formed with a lug 16, against which the pin 14 is held constantly by the tension of the spring 15.

On the segment 10 the outer graduations (in Fig. 1 marked 35 37 39 41 43 45) indicate the measurements for frameless glasses, while the inner series of dots and dashes indicate the size of the glasses with frames, the dashes being used to set the pointer 12 in case of the ordinary shapes (long or oval) and the dots being used to position the pointer 12 in case a full or round-shaped glass of the same size as that indicated by the adjacent dash is to be cut. The inner series of numerical characters (in Fig. 1 shown as 2 1 0 00 000 0000) are placed in register with the dashes and indicate the size of the frame, and the adjacent dot indicates the position of the pointer for cutting a full or round-shaped glass for a frame of the size indicated by the numeral. The dots are so arranged as to insure the cutting of the glass to a size which is a trifle larger and gives enough material to permit of grinding.

Mounted in the offset portion 6 is a screw 17, the inner end of which is rotatably attached to block 9 by means of a pin $9^a$, projecting from the block 9 and engaging a circumferential groove in the inner end of the screw 17, Fig. 6. Thus a movement of the screw 17 lengthwise causes a corresponding movement of the block 9. Furthermore, through the lug 16 on the block 9, pin or arm 14, and shaft 11, Fig. 5, lengthwise movement of the screw 17 causes a rotary movement of the pointer 12. Hence the position of the pointer 12 with relation to the graduations on the segment 10 serves to indicate the position of the block 9 in the slideway 8.

When it is desired to move the pointer without moving the block 9, the set-screw $13^\times$ is loosened, thereby freeing the shaft 11 from the sleeve 13 and permitting the pointer to be adjusted. When a diamond is reset, it frequently (and, in fact, nearly always) happens that it cannot be put back in exactly the same place. After a resetting of the diamond if the lens cut is not of the size indicated by the pointer the operator simply loosens the set-screw $13^\times$ and turns the pointer 12 so that it indicates accurately the size cut. The set-screw is then tightened and the machine is thus adjusted for the new position of the diamond.

To the arm $c'$ is secured a hook 18, and to the carrier $g$ is secured one end of a spiral spring 19, the other end of which is secured to the chain 20. (See Figs. 1 and 3.) The inner concaved end of the block 9 is yieldingly held against the pattern $q$ by passing a link of the chain 20 over the hook 18, and the tension of the spring 19 is varied by changing the link that is engaged with the hook 18.

It will be understood from Fig. 3 that the shaft $h$ does not engage the upper end of the sleeve $v$; but simply abuts thereagainst. Hence the sleeve $v$ does not partake of the rotary motion of the shaft $h$.

The operation is as follows: The top gear $i$, shaft $h$, and presser-disk $r$ being raised to the position shown by the dotted lines in the upper part of Fig. 1, the pattern $q$ is placed in position upon the top of the arm $c'$. The top gear $i$, shaft $h$, and presser-disk are lowered to the position shown by the full lines in Fig. 1, the studs $r'\ r''$ entering their coöperating holes $q'\ q''$ in the pattern $q$. The block 9 is by means of the screw 17 adjusted to its proper position for the cutting of the lens of desired size, the position being indicated by the pointer 12 and graduations on the segment 10. The carrier $g$ is swung to bring the block 9 into contact with the pattern $q$ and is held in yielding contact therewith by looping a link of the chain 20 over the hook 18.

The glass to be cut is placed upon the lens-bed $s$ and by its weight forces the centering-pin $x$ down against the slight tension of its weak controlling-spring $y$. The lever $z$ is depressed to the position shown by dotted lines in Fig. 1 and forces up the slidable shaft $p$, the gear $o$, and the lens-bed $s$, thereby carrying the glass into contact with the tool in the holder 3 and against the tripod $t\ t\ t$ and forcing the tripod-shaft $u$ up into its socket in the sleeve $v$ against the tension of the spring $w$. The lever $z$ being maintained in its dotted-line position of Fig. 1, the gear $i$ is through the knob $j$ manually rotated, thereby communicating rotary motion to the shaft $h$, the presser-disk $r$, the pattern $q$, the train of gearing comprising the pinions $m$ and $n$ and gear $o$, the lens-bed $s$, the work resting upon the lens-bed and the tripod $t\ t\ t$.

What we claim is—

1. In a lens-cutting machine, the combination with a lens-bed and a shaft for rotating the same, of a centering mechanism mounted in said shaft.

2. In a lens-cutting machine, the combination with a lens-bed and a shaft for rotating the same, of a spring-controlled centering-pin mounted in said shaft.

3. In a lens-cutting machine, the combination with a lens-bed and a shaft for rotating the same, of a spring-controlled centering-pin mounted in said shaft and adapted to project through said bed.

4. In a lens-cutting machine, the combination with a tool-holder, a pattern and means for keeping said tool-holder in contact with said pattern, of a positioning device for said holder and spring-controlled mechanism for indicating the adjustment of said positioning device.

5. In a lens-cutting machine, the combination with a tool-holder, a pattern and means for keeping said tool-holder in contact with said pattern, of a positioning device for said holder; a graduated segment mounted upon said holder; and a spring-controlled pointer for indicating upon said segment the adjustment of said device.

6. In a lens-cutting machine, the combination of a tool-holder; a positioning device therefor; a spring-controlled crank-arm which follows the movements of said device; a shaft fast upon one end of which is said crank-arm and fast upon the other end of which is a pointer; said pointer; and a graduated member which coöperates with said pointer to indicate the adjustment of said device.

7. In a lens-cutting machine, the combination with a pattern; a support therefor; a driving mechanism and a shaft for said driving mechanism, of a presser-disk fast upon said shaft for holding said pattern against its said support; said shaft being lengthwise movable to raise said presser-disk and permit the removal of said pattern from its support.

8. In a lens-cutting machine, the combination with a supporting-frame and cutting mechanism mounted therein, of a device for holding the work, said device comprising a revoluble tripod mounted in said frame.

9. In a lens-cutting machine, the combination with a supporting-frame and cutting mechanism mounted therein, of a lens-bed upon which the work rests; a centering-pin beneath the work; and a revoluble tripod above the work.

10. In a lens-cutting machine, the combination of a frame; a driving-shaft mounted in said frame; a pattern-support; and a pattern; said shaft holding said pattern against its said support and being lengthwise slidable to permit the removal of said pattern from between the lower end of said shaft and said support.

11. In a lens-cutting machine, the combination of a frame; a driving-shaft mounted in said frame; a lens-support; means for transmitting the rotary motion of said shaft to said lens-support; a pattern; and a pattern-support against which said pattern is held by said shaft; said shaft being lengthwise movable in said frame to raise its lower end above said pattern-support and pattern and permit said pattern to be passed between the lower end of said shaft and said pattern-support.

12. In a lens-cutting machine, the combination with a supporting-frame and cutting mechanism mounted therein, of a spring-pressed work-holding revoluble tripod.

13. In a lens-cutting machine, the combination with a supporting-frame and a revoluble lens-bed mounted therein, of a revoluble tripod for holding the work upon said lens-bed; and means for pressing said tripod against the work with a uniform pressure.

14. In a lens-cutting machine, the combination with a lens-bed and mechanism for rotating the same, of a revoluble tripod driven by the rotation of said lens-bed.

15. In a lens-cutting machine, the combination with a lens-bed of a centering-pin which projects upwardly therethrough and is adapted to contact with the under side of the work.

16. The combination of a pattern and means for rotating the same with a tool-holder; means for positioning said tool-holder with respect to said pattern; a graduated member and a pointer coöperating therewith to indicate the position of said tool-holder with respect to said pattern and thereby the size of the lens to be cut; said graduated member having a scale graduated to millimeters for the cutting of frameless lenses and a scale graduated in arbitrary numbers for the cutting of frame-lenses; whereby the operator is enabled to pass readily from the cutting of frameless lenses to frame-lenses of the same pattern.

17. The combination of a pattern and means for rotating the same with a tool-holder; means for positioning said tool-holder with respect to said pattern; a graduated member and a pointer coöperating therewith to indicate the position of said tool-holder with respect to said pattern and thereby the size of the lens to be cut; said graduated member having a scale graduated in millimeters for the cutting of frameless lenses, a scale graduated in arbitrary numbers for the cutting of frame-lenses and a scale with graduations for cutting full lenses, whereby the operator is enabled to pass readily from cutting one class of lens to another for the same pattern with accuracy.

18. In a lens-cutting machine, the combination with a tool-holder and mechanism for positioning the same, of complementary indicating members for indicating the position of the tool-holder and thereby the size of the lens to be cut, one of said members being movable; devices connecting said movable member with said mechanism; and means for disconnecting said movable member from said devices to permit the independent adjustment of said movable member.

19. In a lens-cutting machine, the combination with a tool-holder; a block slidably mounted therein; means controlling the position of said block; an indicating device for showing the position of said block; and means permitting the adjustment of said indicating device independent of said block.

WALTER W. SLADE.
HENRY F. BOWER.

Witnesses for Slade:
    FREDERIC D. FULLER,
    DANIEL W. MACNIVEN.

Witnesses for Bower:
    GEO. F. BOWER,
    C. S. NICKERSON.